United States Patent [19]

Ramacier, Jr. et al.

[11] Patent Number: 5,845,943
[45] Date of Patent: Dec. 8, 1998

[54] HYBRID INSERT FOR FLUID COUPLINGS

[75] Inventors: Patrick J. Ramacier, Jr., St. Paul; James W. Brown, Woodbury, both of Minn.

[73] Assignee: Colder Products Company, St. Paul, Minn.

[21] Appl. No.: 758,670

[22] Filed: Dec. 2, 1996

[51] Int. Cl.[6] ..................................................... F16L 37/00
[52] U.S. Cl. ........................ 285/12; 285/317; 137/614.04
[58] Field of Search ........................ 251/149.6; 137/269, 137/614.04, 614.05; 141/367; 285/12, 317; D23/262; D24/129

[56] References Cited

U.S. PATENT DOCUMENTS

| | | | |
|---|---|---|---|
| 3,567,175 | 3/1971 | Sciuto | 285/12 |
| 4,239,184 | 12/1980 | Dudar | 285/12 |
| 4,344,455 | 8/1982 | Norton et al. | 137/614.05 |
| 4,357,037 | 11/1982 | Oetiker | 285/12 |
| 4,436,125 | 3/1984 | Blenkush . | |
| 4,473,211 | 9/1984 | Fremy | 251/149.6 |
| 4,613,112 | 9/1986 | Phlipot | 285/317 |
| 4,863,201 | 9/1989 | Carstens | 285/317 |
| 4,934,655 | 6/1990 | Blenkush et al. . | |
| 5,033,777 | 7/1991 | Blenkush et al. . | |
| 5,052,725 | 10/1991 | Meyer et al. . | |
| 5,144,979 | 9/1992 | Shobuzako et al. | 137/614.04 |
| 5,165,728 | 11/1992 | Mayer | 285/12 |
| 5,178,303 | 1/1993 | Blenkush et al. . | |
| 5,494,074 | 2/1996 | Ramacier, Jr. et al. . | |
| 5,628,726 | 5/1997 | Cotter | 137/614.04 |

Primary Examiner—Eric K. Nicholson
Attorney, Agent, or Firm—Merchant, Gould, Smith, Edell, Welter & Schmidt

[57] ABSTRACT

A hybrid male coupling member adaptable to couple with at least two types of female coupling members includes a one piece integrally molded housing having a front engagement wall, a fluid path being defined by an inner wall. The inner wall has an engagement section disposed proximate a front end of the housing. The male coupling member further includes a first groove being disposed around an outer wall of the housing and a second groove being disposed in the first groove. When the male coupling member couples with the first female coupling member, the engagement section of the male coupling member engages with a spring-biased poppet of the first female coupling member and forces the poppet toward a back end of the first female coupling member so as to allow the fluid to flow therethrough, a plastic clip being received in the first groove to latch the male coupling member and the first female coupling member together. When the male coupling member couples with the second female coupling member, the front engagement wall of the male coupling member engages with a spring-biased poppet of the second female coupling member and forces the poppet toward a back end of the second female coupling member so as to allow the fluid to flow therethrough, a metal clip being disposed in the second groove to latch the male coupling member and the second female coupling member together.

6 Claims, 6 Drawing Sheets

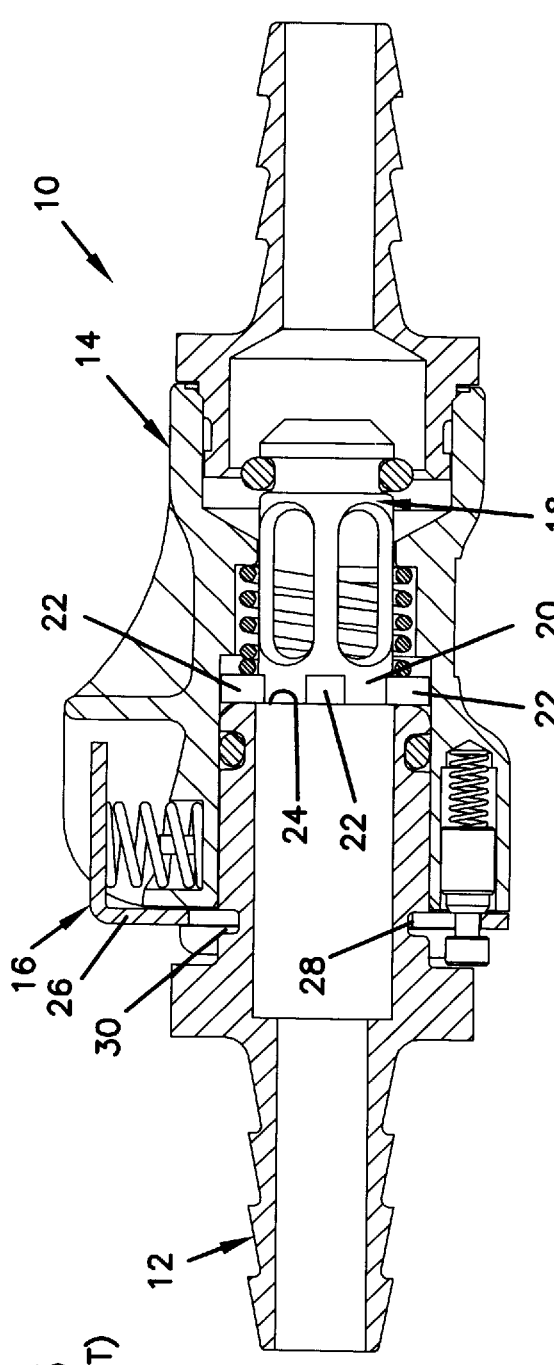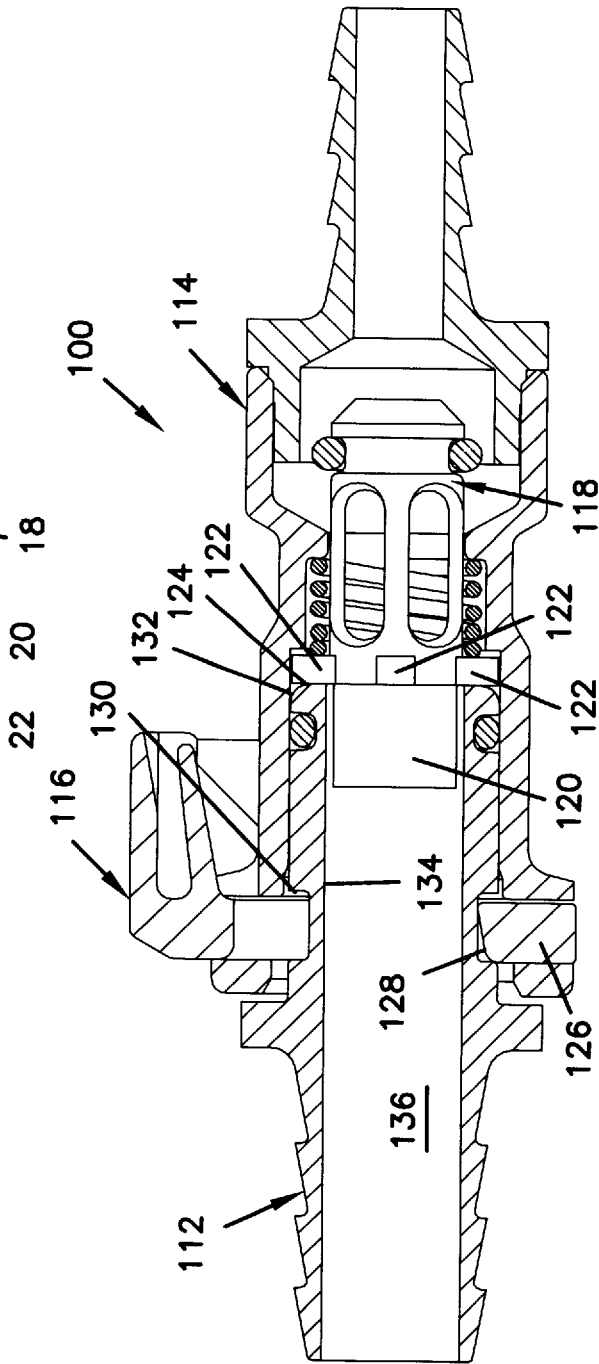
FIG. 3
(PRIOR ART)
FIG. 4
(PRIOR ART)

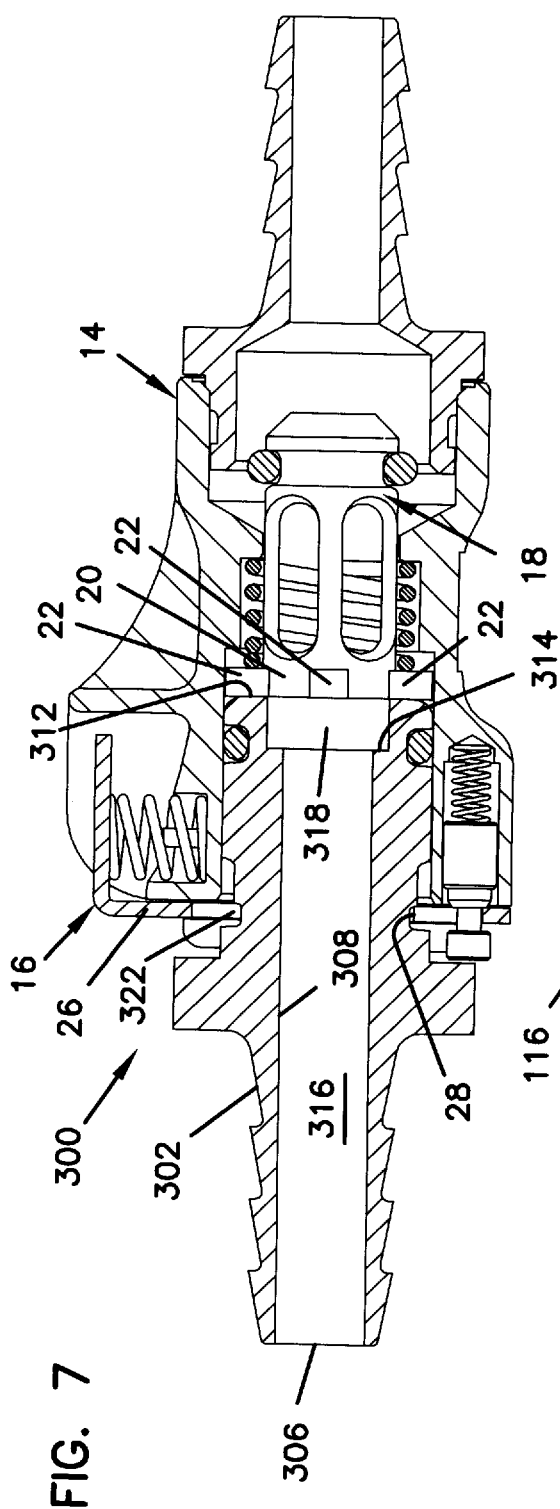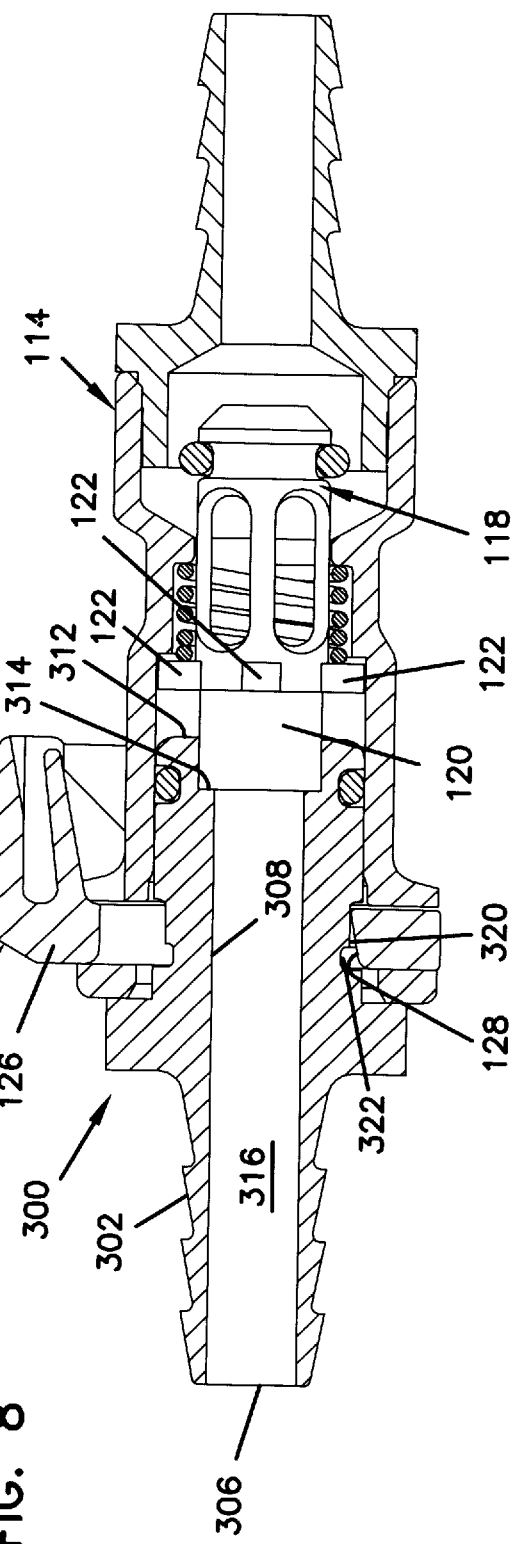

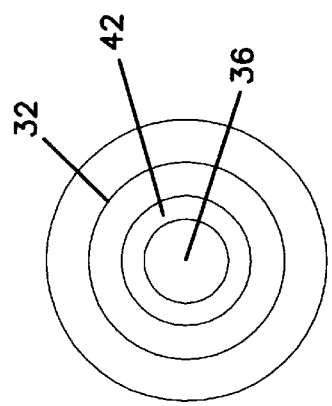
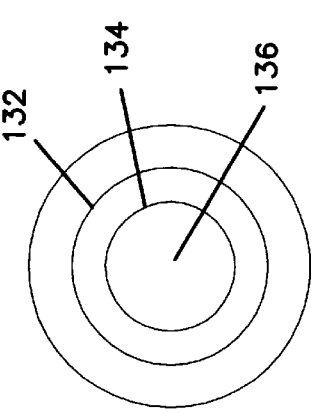
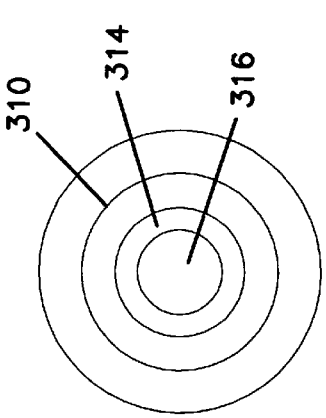
FIG. 10 (PRIOR ART)
FIG. 12 (PRIOR ART)
FIG. 14
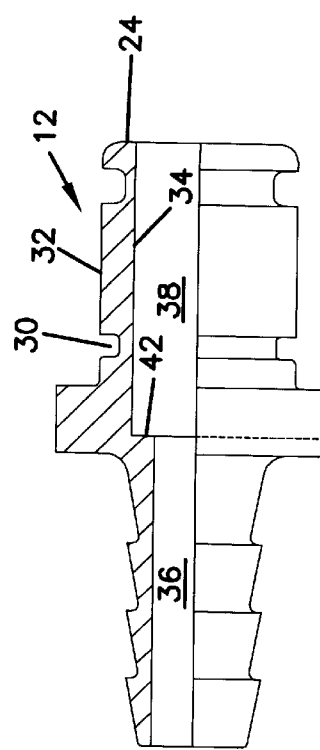
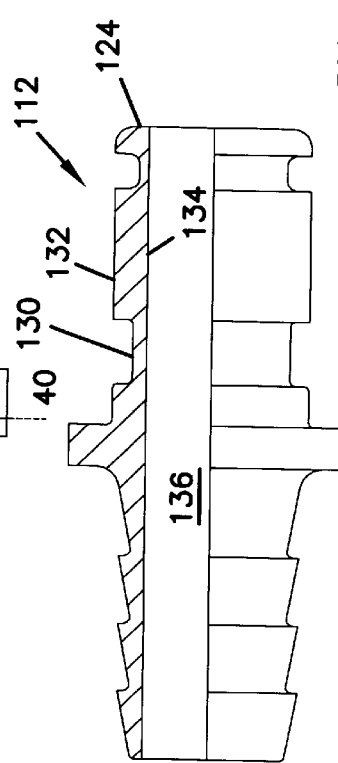
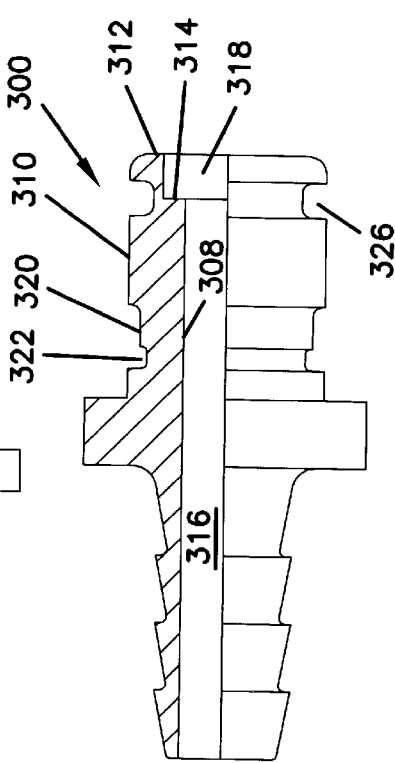
FIG. 9 (PRIOR ART)
FIG. 11 (PRIOR ART)
FIG. 13

HYBRID INSERT FOR FLUID COUPLINGS

FIELD OF THE INVENTION

The present invention relates generally to fluid couplings, and more particularly, to fluid couplings having a hybrid male coupling member for coupling with different types of female coupling members.

BACKGROUND OF THE INVENTION

There have been commercially available various fluid couplings, such as quick connect/disconnect couplings, for small flexible tube application. Such couplings are utilized for biomedical applications, convenience handling, beverage dispensing, instrument connections, photochemical handling, etc.

One type of commercially available coupling has been disclosed in U.S. Pat. No. 4,436,125, issued to Blenkush and assigned to Colder Products Company, in which a quick connect/disconnect coupling assembly has a male coupling member and a female coupling member. The female coupling member has a poppet valve and a latch mechanism having a metal clip transversely disposed and slidably retained in the female coupling member. Upon engagement between the male and female coupling members, the poppet valve opens up the fluid flow path defined by the female coupling member and allows the fluid to flow therethrough. Further upon engagement, a thin edge portion of the metal clip is received in a corresponding narrow groove disposed on an outside housing of the male coupling member so as to latch the two members together.

A second type of commercially available coupling has been disclosed in U.S. Pat. No. 5,052,725, issued to Meyer et al. and assigned to Colder Products Company, in which a male coupling member is engaged/disengaged with a female coupling member by a latch mechanism including a plastic clip transversely disposed, slidably retained in the female coupling member. Upon engagement, a thick edge portion of the plastic clip is received in a corresponding wide groove disposed on an outside housing of the male coupling member so as to latch the two coupling members together.

U.S. Pat. No. 5,178,303, issued to Blenkush et al. and assigned to Colder Products Company, also described the plastic clip in a dispensing valve. Further, U.S. Pat. No. 5,494,074, issued to Ramacier, Jr. et al. and assigned to Colder Product Company, described the plastic clip in a quick connection coupling valve assembly.

Accordingly, in the commercially available couplings, a specific male coupling member is used to engage with a particular female coupling member. As a result, different types of male coupling members are manufactured to fit with different types of female coupling members. Different types of molds for those male coupling members are designed. Accordingly, a lot of materials are wasted. Further, in an emergency situation, such as a medical emergency, when a specific type of male coupling member is required, it would be difficult to sort out the right one if different male coupling members are alike such as those that are shown in FIGS. 1 and 2. Therefore, there is a need for a hybrid male coupling member to fit for different types of female coupling members.

The present invention provides a hybrid male coupling member to solve these and other problems and offers other advantages over the prior art.

SUMMARY OF THE INVENTION

The present invention relates generally to fluid couplings, and more particularly, to fluid couplings having a hybrid male coupling member for coupling with different types of female coupling members.

In one embodiment, a hybrid insert member adaptable to couple with at least two types of female receptacle members comprises a one piece integrally molded housing having front and back ends, inner and outer walls, and a front wall integrally connecting the inner and outer walls. A fluid path is defined by the inner wall along a longitudinal axis of the housing, the inner wall having an engagement section disposed proximate the front end of the housing, and the engagement section being substantially perpendicular to the longitudinal axis. A first groove is disposed around the outer wall of the housing, and a second groove is disposed in the first groove. The second groove is parallel to the first groove around the longitudinal axis. A first female receptacle member is lockable in the first groove when the insert member couples with the first female receptacle member. A second female receptacle member is lockable in the second groove when the insert member couples with the second female receptacle member.

One of the advantages of the present invention is that the present hybrid male insert member is configured to engage with at least two female receptacle members.

In another embodiment, the hybrid male insert member includes a third groove disposed proximate the front end of the housing, the third groove retaining a resilient O-ring. One advantage of having the resilient O-ring is that the O-ring is engageable with an inner wall of the female receptacle member, when the hybrid male insert member is coupled with the female receptacle member, so as to prevent any fluid leakage from the fluid path.

Further in another embodiment, the inner wall of the hybrid insert member has a first bore section extending substantially the entire fluid path from the back end of the housing to the engagement section and a second larger bore section extending from the engagement section to the front end of the housing.

In an alternative embodiment, a hybrid insert member is adaptable to couple with a first female receptacle member and a second female receptacle member. The first female receptacle member includes a first spring-biased poppet having a cylindrical portion projecting forward of a radially extending ribbed portion. The second female receptacle member includes a second spring-biased poppet having a cylindrical portion substantially flush with a radially extending ribbed portion. The first female receptacle member has a clip member with a latch plate transversely disposed proximate a front end of the first female receptacle member. The second female receptacle member has a clip member with a latch plate transversely disposed proximate a front end of the second female receptacle member. Each of the latch plates have an edge portion configured for engagement with the insert member. The edge portion of the latch plate of the second female receptacle member has a lesser thickness than that of the first female receptacle member.

Still in the alternative embodiment, the hybrid insert member comprises: a one piece integrally molded housing having front and back ends, inner and outer walls, and a front wall integrally connecting the inner and outer walls; a fluid path for a flow of fluid therethrough being defined by the inner wall along a longitudinal axis of the housing, the inner wall having an engagement section disposed proximate the front end of the housing, the engagement section being substantially perpendicular to the longitudinal axis, the inner wall having a first bore section extending substantially the entire fluid path from the back end of the housing to the engagement section, a second larger bore section extending from the engagement section to the front end of the housing; a first groove being disposed around the outer wall of the housing; a second groove being disposed in the first groove, the second groove parallel to the first groove around the longitudinal axis; and wherein when the insert member couples with the first female receptacle member, the second larger bore section of the insert member slides over the cylindrical portion of the first female receptacle member such that the engagement section of the insert member engages with a front end of the cylindrical portion and forces the first spring-biased poppet toward a back end of the first female receptacle member so as to allow the fluid to flow through the first female receptacle member, the edge portion of the latch plate of the first female receptacle member being disposed in the first groove so as to latch the insert member and the first female receptacle member together, and wherein when the insert member couples with the second female receptacle member, the front wall of the insert member engages with the ribbed portion of the second female receptacle member and forces the second spring-biased poppet toward a back end of the second female receptacle member so as to allow the fluid to flow through the second female receptacle member, the edge portion of the latch plate of the second female receptacle member being disposed in the second groove so as to latch the insert member and the second female receptacle member together.

These and various other advantages and features of novelty which characterize the invention are pointed out with particularity in the claims annexed hereto and forming a part hereof. However, for a better understanding of the invention and its advantages and objects obtained by its use, reference should be made to the drawings which form a further part hereof and to the accompanying descriptive matter, in which there is illustrated and described a preferred embodiment of the invention.

BRIEF DESCRIPTION OF THE DRAWINGS

A better understanding of the construction and operational characteristics of a preferred embodiment(s) can be realized from a reading of the following detailed description, especially in light of the accompanying drawings in which like reference numerals in the several views generally refer to corresponding parts.

FIG. 3 is a cross-sectional view of the PLC of FIG. 1 in a coupled stage.

FIG. 4 is a cross-sectional view of the APC of FIG. 2 in a coupled stage.

FIG. 7 is a cross-sectional view of the hybrid male coupling member coupled with the female coupling member of the PLC as shown in FIG. 5.

FIG. 8 is a cross-sectional view of the hybrid male coupling member coupled with the female coupling member of the APC as shown in FIG. 6.

FIG. 9 is a partial cross-sectional view of the conventional male coupling member of the PLC as shown in FIG. 1.

FIG. 10 is a front end view of the conventional male coupling member of the PLC as shown in FIG. 9.

FIG. 11 is a partial cross-sectional view of the conventional male coupling member of the APC as shown in FIG. 2.

FIG. 12 is a front end view of the conventional male coupling member of the APC as shown in FIG. 11.

FIG. 13 is a partial cross-sectional view of the hybrid male coupling member as shown in FIGS. 6 and 7.

FIG. 14 is a front end view of the hybrid male coupling member as shown in FIG. 13.

DETAILED DESCRIPTION OF THE PREFERRED EMBODIMENT

Figure 1:
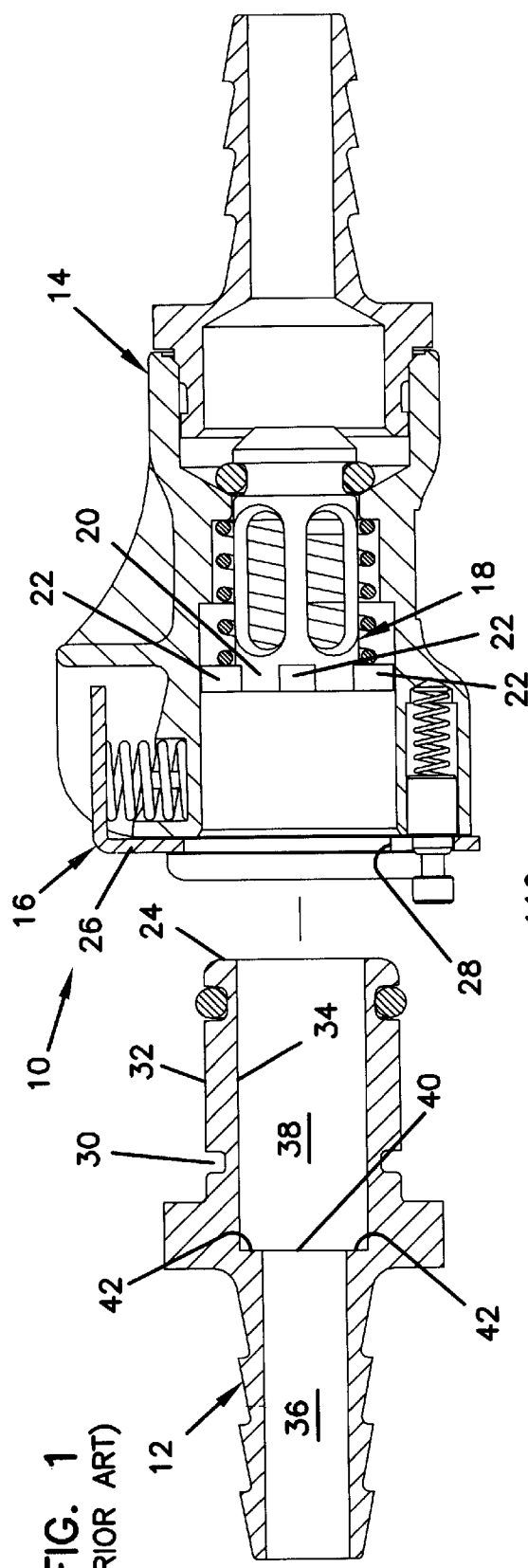
FIG. 1 is a cross-sectional view of a conventional male coupling member separated from a female coupling member in a conventional coupling assembly called Plastic Large Coupling (PLC)
Figure 2:
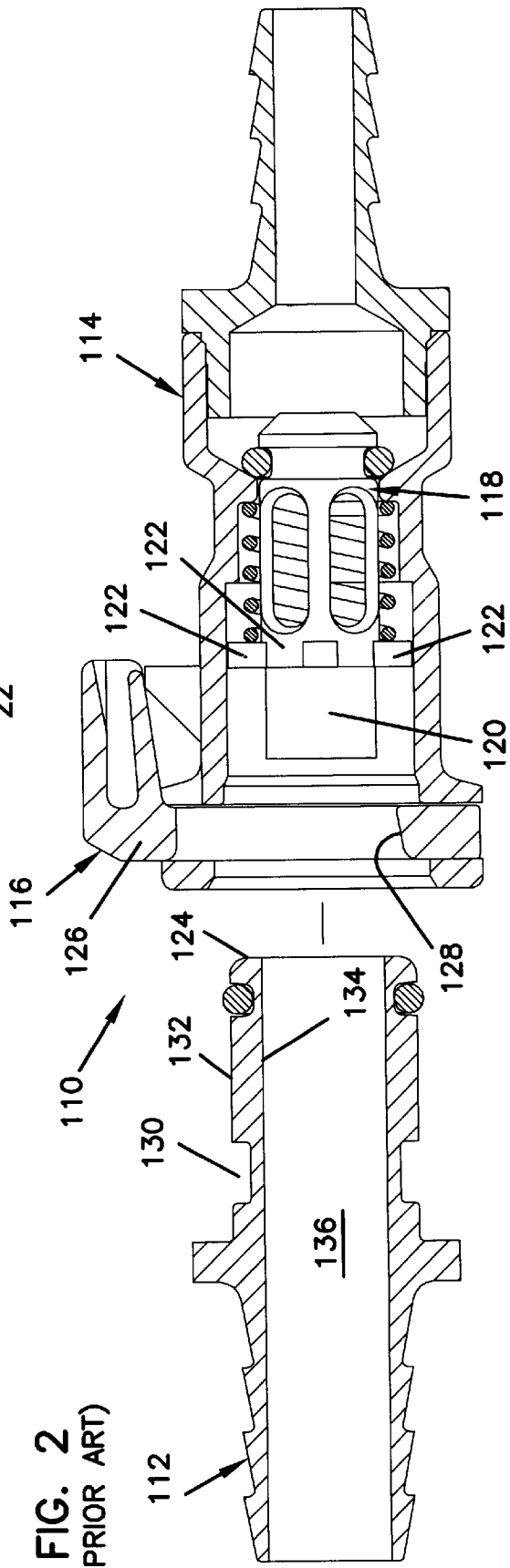
FIG. 2 is a cross-sectional view of a conventional male coupling member separated from a female coupling member in a conventional coupling assembly called All Plastic Coupling (APC).

With reference to FIGS. 1 and 2, a conventional coupling called Plastic Large Coupling (PLC), designated as reference numeral 10, is shown. The PLC coupling 10 includes a male coupling member 12 and a female coupling member 14. The male coupling member 12 and the female coupling member 14 are engageable with each other and latched to each other by a clip member 16 which is transversely, slidably disposed proximate the front end of the female coupling member 14. The detailed description of the parts of the female coupling member 14 and their corresponding functions are generally referred to in U.S. Pat. No. 4,436,125 and U.S. Pat. No. 5,033,777, which are incorporated herewith by reference.

The female coupling member 14 includes a spring-biased poppet 18 having a cylindrical portion 20 substantially flush with a radially extending ribbed portion 22. When the female coupling member 14 is not engaged with the male coupling member 12, the poppet 18 closes a flow path in the female coupling member 14.

The male coupling member 12 has a front end wall 24. Upon engagement of the female and male coupling members, the front end wall 24 is engaged with the flush cylindrical portion 20 and the ribbed portion 22 such that the spring-biased poppet 18 is forced toward a back end of the female coupling member 14 to open up the fluid path so as to allow the fluid to flow through the female coupling member 14. As shown in FIG. 3, the female and male coupling members 14, 12 of the PLC 10 are engaged to each other and are latched by the clip member 16. The clip member 16 includes a latch plate 26 having an edge portion 28 configured for engagement with the male coupling member 12. (The clip member 16 is a metal clip.) Upon engagement, the edge portion 28 of the metal clip 16 is disposed in a groove 30 disposed around an outer wall 32 of the male coupling member 12.

To release the male coupling member 12 from the female coupling member 14, the clip member 16 is compressed downwardly so that the edge portion 28 of the latch plate 26 is disengaged from the groove 30 of male coupling member 12.

The male coupling member 12 has an inner wall 34 which defines a first bore section 36 and a second bore section 38.

The first bore section 36 extends from the back end of the male coupling member 12 to a molding partitioning line 40 disposed proximate a middle portion of the male coupling member, while the second bore section 38 extends from the front end of the male coupling member 12 to the molding partitioning line 40. The second bore section 38 has a larger diameter than the first bore section 36, such that a shoulder section 42 is disposed along the molding partitioning line 40.

With respect to FIGS. 2 and 4, a conventional coupling assembly called All Plastic Coupling (APC) 110 is shown. The APC 110 includes a male coupling member 112 and a female coupling member 114. The male and female coupling members 112 and 114 are engageable to each other and are latched to each other by a clip member 116. The clip member 116 is transversely, slidably disposed proximate a front end of the female coupling member 114. The detailed parts of the clip member 116 have been described in U.S. Pat. No. 5,052,725 and are incorporated herewith by reference. The clip member 116 includes a latch plate 126 having an edge portion 128. The edge portion 128 is configured for engagement with the male coupling member 112. The clip member 116 is a plastic clip, as opposed to a metal clip 16 as shown in FIGS. 1 and 3. The edge portion 128 of the plastic clip 116, upon engagement between the male and the female coupling members 112, 114, is disposed in a groove 130 on the outer wall 132 of the male coupling member 112.

The female coupling member 114 includes a spring-biased poppet 118 having a cylindrical portion 120 projecting forward of a radially extending ribbed portion 122. The male coupling member 112 has a front end wall 124 and an inner wall 134 which defines a bore 136 therein. Upon engagement of the two coupling members 112, 114, the inner wall 134 slides over the cylindrical portion 120 until the front end wall 124 engages with the ribbed portion 122. The poppet 118 is forced toward the back end of the female coupling member 114 so as to open up the flow path in the female coupling member 114.

As shown in FIGS. 1–4, the edge portion 28 of the metal clip member 16 has a thin thickness which latches into a corresponding narrow groove 30 of the male coupling member 12. On the other hand, the edge portion 128 of the plastic clip member 116 has a thicker thickness which latches into a corresponding wide groove 130 of the male coupling member 112.

Now referring to FIGS. 5–8, a hybrid male coupling member, or called a hybrid male insert, is shown, generally in accordance with the principles of the present invention. The hybrid male coupling member, designated as reference numeral 300, is engageable with both the PLC female coupling member 14 and the APC female coupling member 114. The female coupling members 14 and 114 are generally the same as those shown in FIGS. 1 and 2. Accordingly, the reference numerals are kept the same with respect to the female coupling members as shown in FIGS. 5–8.

The hybrid male coupling member 300 includes a one piece integrally molded housing 302 having a front end 304 and a back end 306, an inner wall 308 and an outer wall 310. The hybrid insert member further includes a front end wall 312 integrally connecting the inner wall 308 and the outer wall 310.

A fluid path is defined by the inner wall 308 along a longitudinal axis I—I of the housing 302. The inner wall 308 has an engagement section 314 disposed proximate the front end 304 of the housing 302. The engagement section 314 is substantially perpendicular to the longitudinal axis I—I. The inner wall 308 further includes a first bore section 316 extending substantially the entire fluid path from the back end 306 of the housing 302 to the engagement section 314, and a second larger bore section 318 extending from the engagement section 314 to the front end 304 of the housing 302.

A first groove 320 is disposed around the outer wall 310 of the housing 302. A second groove 322 is disposed in the first groove 320 and is parallel to the first groove 320 around the longitudinal axis I—I. The first groove 320 is adapted to receive the thicker edge portion 128 of the plastic clip member 116 of the APC female coupling member 114. The second groove 322 is disposed in the first groove 320 and is configured to receive the edge portion 28 of the metal clip member 16 of the PLC female coupling member 14. The first and second grooves 320 and 322 are disposed around the outer wall 310 of the housing 302. The second groove 322 is generally parallel to the first groove 320 around the longitudinal axis I—I.

When the hybrid male coupling member 300 couples with the PLC female coupling member 14, the second larger bore section 318 of the front end wall 312 of the hybrid male coupling member 300 engages with the ribbed portion 22 of the female coupling member 14. The front end wall 312 forces the spring-biased poppet 18 toward the back end of the female coupling member 14 so as to allow the fluid to flow through the female coupling member 14. The edge portion 28 of the metal latch plate 26 is disposed in the second groove 322 so as to latch the male coupling member 300 and the female coupling member 14 together. The engagement between the two coupling members 300, 14, is shown in FIG. 7.

To release the hybrid male coupling member 300 from the PLC female coupling member 14, the clip member 16 is compressed to disengage the edged portion 28 from the second groove 322, whereby the poppet 18 is biased toward the front end of the female coupling member 14 so as to close the fluid path in the female coupling member 14. The forward bias force pushes the male coupling member 300 away from the female coupling member 14.

When the hybrid male coupling member 300 couples with the APC female coupling member 114, the second larger bore section 318 of the hybrid male coupling member 300 slides over the cylindrical portion 120 of the APC female coupling member 114, such that the engagement section 314 of the hybrid male coupling member 300 engages with a front end portion 324 of the cylindrical portion 120. Further engagement forces the spring-biased poppet 118 toward a back end of the APC female coupling member 114 so as to allow the fluid to flow through the APC female coupling member 114. The edge portion 128 of the plastic latch plate 126 is disposed in the first groove 320 so as to latch the hybrid male coupling member 300 and the APC female coupling member 114 together.

The first bore section 316 has a smaller diameter than the second bore section 318 so that the engagement section 314 is a shoulder section between the first and second bore sections. The engagement section is substantially perpendicular to the longitudinal axis I—I of the hybrid male coupling member 300.

Figure 5:
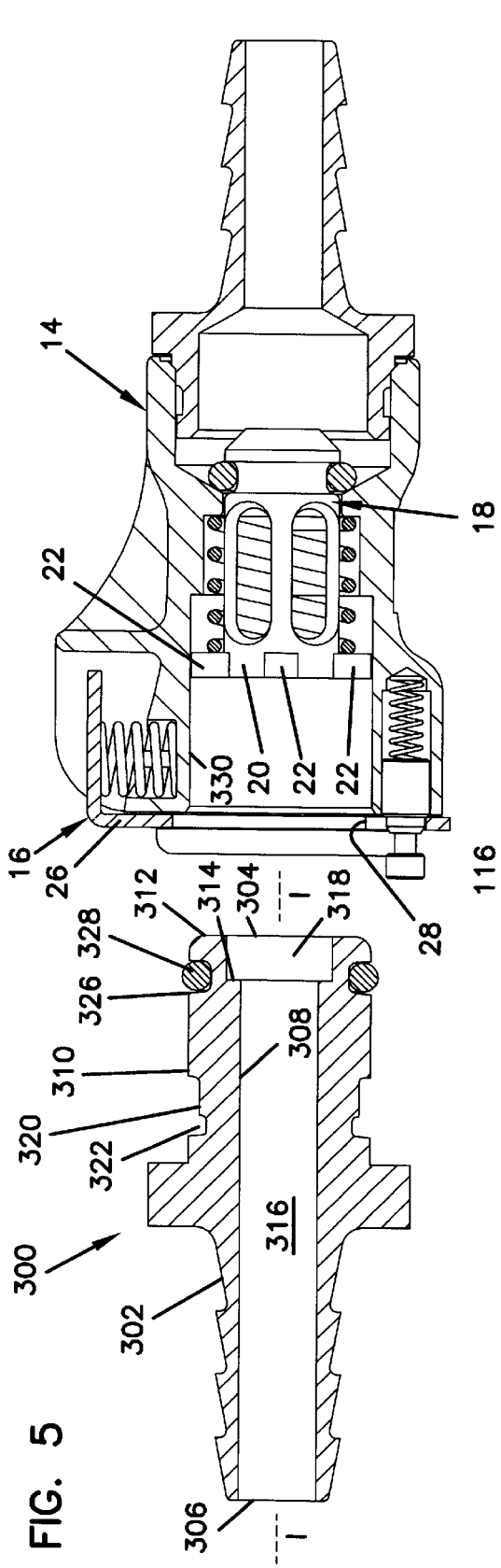
FIG. 5.1 is a cross-sectional view of a hybrid male coupling member separated from the female coupling member of the PLC as shown in FIG. 1, generally in accordance with the principles of the present invention.
Figure 6:
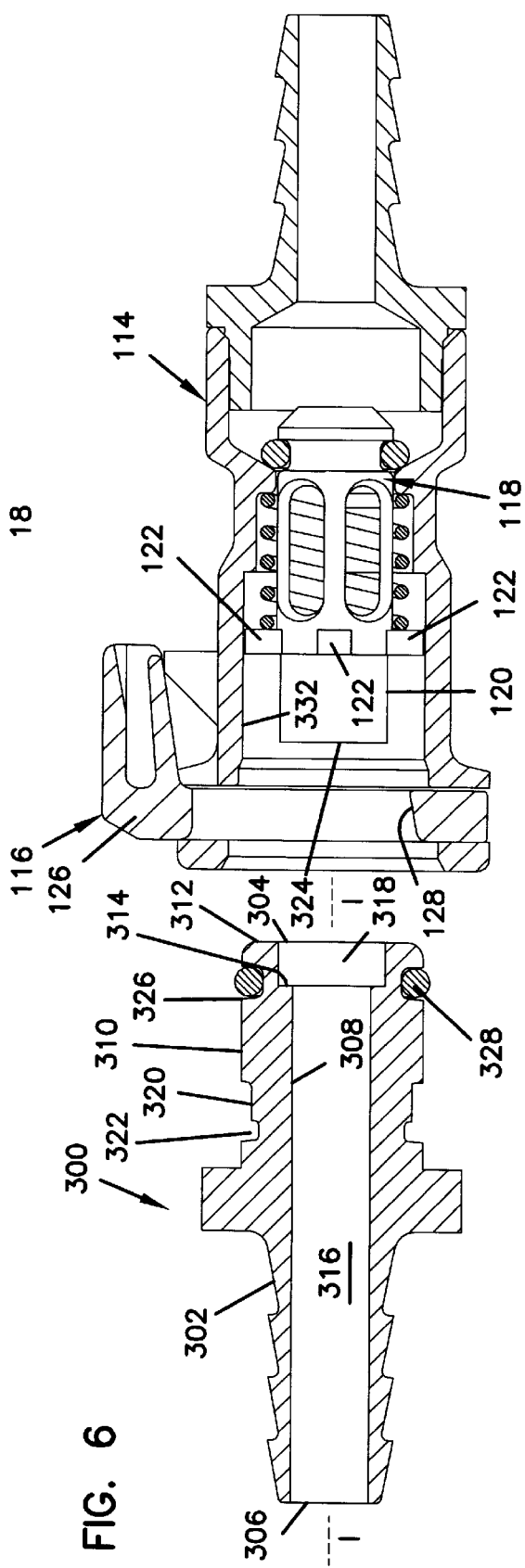
FIG. 6 is a cross-sectional view of the hybrid male coupling member separated from the female coupling member of the APC as shown in FIG. 2, generally in accordance with the principles of the present invention.

As shown in FIGS. 5–6, the first groove 320 is much wider than the second groove 322. In other words, the first annual groove 320 has a larger thickness than that of the second annual groove 322 such that a part of the thickness of the first groove 320 is covered by that of the second groove 322. The wider first groove 320 corresponds to the thicker edge portion 128 of the plastic clip 116, whereas the narrower groove 322 corresponds to the thinner edge portion 28 of the metal clip member 16. Accordingly, the male coupling member 300 can be used to at least couple with the PLC female coupling member 14 and the APC female coupling member 114. It is appreciated that the hybrid male coupling member 300 can be configured to couple with other types of female coupling members, generally in accordance with the principles of the present invention.

The hybrid male coupling member 300 includes a third groove 328 disposed proximate the front end 304 of the housing 302. The third groove 326 retains a resilient O-ring 328. The resilient O-ring 328 engages with the inner walls 330, 332 of the PLC female coupling member 14 and the APC female coupling member 114, respectively, so as to prevent fluid leakage from the fluid path to the outside of the coupling members. FIGS. 9, 11, and 13 show the above described three male coupling members 12, 112, 300, respectively. For illustration purposes, the three male coupling members 12, 112, 300 are aligned up at the front wall 24, 124, 312. FIGS. 10, 12, and 14 illustrate the front end views of the three male coupling members as shown in FIGS. 9, 11, and 13, respectively.

Figure 15:
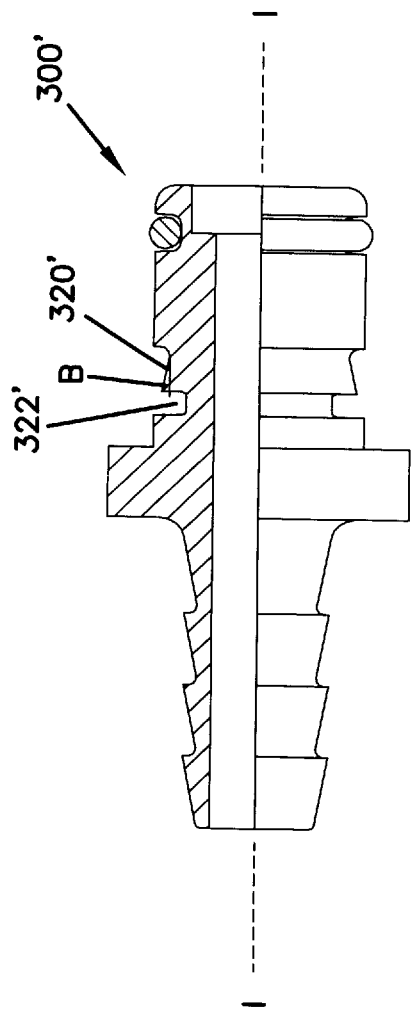
FIG. 15 is a second embodiment of the hybrid male coupling member.

FIG. 15 shows a second embodiment of the hybrid male coupling member 300'. The first groove 320' presents an angle with respect to the longitudinal axis I—I of the hybrid male coupling member 300'. The angle, designated as α, is about 12°. It is appreciated that other angles can be used generally in accordance with the principles of the present invention. One advantage of having such an angle is that it prevents the metal clip member 16 from being easily disengaged from the second groove 322'.

Figure 16:
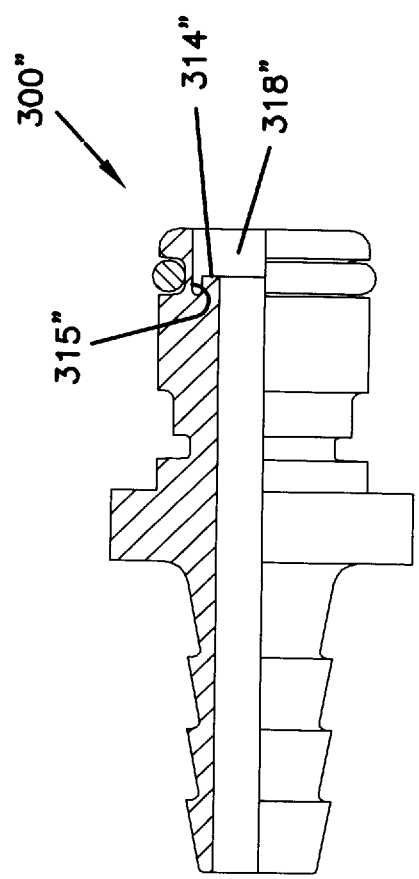
FIG. 16 is a third embodiment of the hybrid male coupling member.

FIG. 16 shows a third embodiment of the hybrid male coupling member 300". The engagement section 314" includes a U-shaped groove 315' which receives the cylindrical portion 120 of the APC female coupling member 114. Accordingly, the hybrid male coupling member 300" can be used to couple with female coupling members having different lengths or shapes of a cylindrical portion. It is appreciated that other types of engagement sections can be configured generally in accordance with the principles of the present invention.

The hybrid male coupling member 300, 300', or 300" is made of plastic materials so that it is disposable. As described above, a hybrid male coupling member is capable of coupling with the female coupling member 114 of the All Plastic Couplings (APC) and with the female coupling member 14 of the Plastic Large Couplings (PLC). It is appreciated that other types of female coupling members can be coupled to the hybrid male coupling member generally in accordance with the principles of the present invention. It is also appreciated that the other types of female coupling members can include a clip member being made of other materials, such as thin nylon(s), instead of thin metal(s) for the clip member 16, and being made of other materials, such as thick nylon(s), instead of thick plastic(s) for the clip member 116, generally in accordance with the principles of the present invention.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A hybrid insert member adaptable to couple with at least two different types of female receptacle members, comprising:
   a one piece integrally molded housing having front and back ends, inner and outer walls, and first engaging means for engaging the insert member with a first one of the female receptacle members;
   a fluid path being defined by the inner wall along a longitudinal axis of the housing, the inner wall having second engaging means for engaging the insert member with a second, different one of the female receptacle members; and
   groove means, disposed around the outer wall of the housing, for locking the first and second female receptacle members, said groove means being engageable with each of the two different types of female receptacle members.

2. A hybrid insert member adaptable to couple with at least two types of female receptacle members, comprising:
   a one piece integrally molded housing having front and back ends, inner and outer walls, and a front wall integrally connecting the inner and outer walls;
   a fluid path being defined by the inner wall along a longitudinal axis of the housing, the inner wall having an engagement section disposed proximate the front end of the housing, the engagement section being substantially perpendicular to the longitudinal axis;
   a first groove being disposed around the outer wall of the housing;
   a second groove being disposed in the first groove, the second groove parallel to the first groove around the longitudinal axis; and
   a first one of the female receptacle members being lockable in the first groove when the insert member couples with the first female receptacle member, a second one of the female receptacle members being lockable in the second groove when the insert member couples with the second female receptacle member.

3. A hybrid insert member according to claim 2, further comprising a third groove disposed proximate the front end of the housing, the third groove retaining a resilient O-ring.

4. A hybrid insert member according to claim 2, wherein the inner wall has a first bore section extending substantially the entire fluid path from the back end to the engagement section, a second larger bore section extending from the engagement section to the front end of the housing.

5. A hybrid insert member adaptable to couple with at least two types of female receptacle members, comprising:
   a one piece integrally molded housing having front and back ends, inner and outer walls, and first engaging means for engaging the insert member with a first one of the female receptacle members;
   a fluid path being defined by the inner wall along a longitudinal axis of the housing, the inner wall having second engaging means for engaging the insert member with a second one of the female receptacle members; and
   groove means, disposed around the outer wall of the housing, for locking the first and second female receptacle members wherein the groove means includes first groove means disposed around the outer wall of the housing for locking the first female receptacle member, and second groove means disposed in the first groove means for locking the second female receptacle member.

6. A hybrid insert member adaptable to couple with a first female receptacle member and a second female receptacle member, the first female receptacle member including a first spring-biased poppet having a cylindrical portion projecting forward of a radially extending ribbed portion, the second female receptacle member including a second spring-biased poppet having a cylindrical portion substantially flush with a radially extending ribbed portion, the first female receptacle member having a clip member with a latch plate transversely disposed proximate a front end of the first female receptacle member, the second female receptacle member having a clip member with a latch plate transversely disposed proximate a front end of the second female receptacle member, each of the latch plates having an edge portion configured for engagement with the insert member, the edge portion of the latch plate of the second female receptacle member having a lesser thickness than that of the first female receptacle member, the hybrid insert member comprising:

a one piece integrally molded housing having front and back ends, inner and outer walls, and a front wall integrally connecting the inner and outer walls;

a fluid path for a flow of fluid therethrough being defined by the inner wall along a longitudinal axis of the housing, the inner wall having an engagement section disposed proximate the front end of the housing, the engagement section being substantially perpendicular to the longitudinal axis, the inner wall having a first bore section extending substantially the entire fluid path from the back end of the housing to the engagement section, a second larger bore section extending from the engagement section to the front end of the housing;

a first groove being disposed around the outer wall of the housing;

a second groove being disposed in the first groove, the second groove parallel to the first groove around the longitudinal axis; and wherein when the insert member couples with the first female receptacle member, the second larger bore section of the insert member slides over the cylindrical portion of the first female receptacle member such that the engagement section of the insert member engages with a front end of the cylindrical portion and forces the first spring-biased poppet toward a back end of the first female receptacle member so as to allow the fluid to flow through the first female receptacle member, the edge portion of the latch plate of the first female receptacle member being disposed in the first groove so as to latch the insert member and the first female receptacle member together, and wherein when the insert member couples with the second female receptacle member, the front wall of the insert member engages with the ribbed portion of the second female receptacle member and forces the second spring-biased poppet toward a back end of the second female receptacle member so as to allow the fluid to flow through the second female receptacle member, the edge portion of the latch plate of the second female receptacle member being disposed in the second groove so as to latch the insert member and the second female receptacle member together.

\* \* \* \* \*

UNITED STATES PATENT AND TRADEMARK OFFICE
CERTIFICATE OF CORRECTION

PATENT NO. : 5,845,943

DATED : DECEMBER 8, 1998

INVENTOR(S) : RAMACIER, JR. ET AL

It is certified that error appears in the above-identified patent and that said Letters Patent is hereby corrected as shown below:

Col. 3, line 57: "FIG. 5.1is" should read —FIG. 5 is—

Col. 7, line 26: "designated as α" should read —designated as β—

Col. 7, line 35: "315'" should read —315"—

Signed and Sealed this

Twenty-eighth Day of December, 1999

*Attest:*

Q. TODD DICKINSON

*Attesting Officer*     Acting Commissioner of Patents and Trademarks